(12) United States Patent
Jin

(10) Patent No.: US 9,460,117 B2
(45) Date of Patent: Oct. 4, 2016

(54) IMAGE SEARCHING

(71) Applicant: Alibaba Group Holding Limited, Grand Cayman, KY (US)

(72) Inventor: Huaxing Jin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 433 days.

(21) Appl. No.: 13/683,384

(22) Filed: Nov. 21, 2012

(65) Prior Publication Data

US 2013/0138636 A1 May 30, 2013

(30) Foreign Application Priority Data

Nov. 25, 2011 (CN) .......................... 2011 1 0380442

(51) Int. Cl.
G06F 17/30 (2006.01)
(52) U.S. Cl.
CPC ... G06F 17/30244 (2013.01); G06F 17/30247 (2013.01); G06F 17/30268 (2013.01)
(58) Field of Classification Search
CPC .................. G06F 17/30277; G06F 17/30265; G06F 17/30247; G06F 17/30244; G06F 17/30047
See application file for complete search history.

(56) References Cited

U.S. PATENT DOCUMENTS

| 6,584,223 | B1 | 6/2003 | Shiiyama |
| 8,032,483 | B1 | 10/2011 | Haveliwala et al. |
| 8,631,004 | B2 * | 1/2014 | Mishne et al. ................. 707/727 |
| 2003/0229628 | A1 | 12/2003 | Banerjee et al. |
| 2007/0271226 | A1 * | 11/2007 | Zhang et al. ..................... 707/3 |
| 2008/0126191 | A1 | 5/2008 | Schiavi |
| 2009/0024577 | A1 | 1/2009 | Prestel et al. |
| 2010/0205202 | A1 * | 8/2010 | Yang et al. .................... 707/767 |
| 2011/0029561 | A1 * | 2/2011 | Slaney et al. ................. 707/772 |
| 2011/0072047 | A1 * | 3/2011 | Wang et al. .................. 707/776 |
| 2011/0106782 | A1 * | 5/2011 | Ke et al. ....................... 707/706 |
| 2011/0153653 | A1 | 6/2011 | King et al. |

(Continued)

FOREIGN PATENT DOCUMENTS

| CN | 101458695 | 6/2009 |
| CN | 101458711 | 6/2009 |

(Continued)

OTHER PUBLICATIONS

PCT Search Report mailed Mar. 19, 2013 for PCT application No. PCT/US12/66251, 13 pages.

(Continued)

*Primary Examiner* — James E Richardson

(57) ABSTRACT

The present disclosure introduces a method and an apparatus for searching images. With respect to each image in an image searching database, respective labels of respective images are generated based on description information corresponding to the respective images. A corresponding relationship between the generated respective labels and the respective images is stored. Based on a received image searching request, description information corresponding to an image for search in the image searching request is obtained. Based on the description information of the image for search, the label of the image for search is generated. Based on the stored corresponding relationship between the respective labels and the respective images, one or more images corresponding to the label of the image for search are determined. The determined one or more images are sent to the client terminal that sends the image searching request.

15 Claims, 11 Drawing Sheets

(56) References Cited

U.S. PATENT DOCUMENTS

| | | |
|---|---|---|
| 2011/0235900 A1 | 9/2011 | Porikli et al. |
| 2011/0295893 A1 | 12/2011 | Wu |
| 2011/0317923 A1 | 12/2011 | Hondo et al. |
| 2012/0117072 A1* | 5/2012 | Gokturk et al. ............. 707/740 |
| 2012/0124034 A1 | 5/2012 | Jing et al. |
| 2012/0275705 A1 | 11/2012 | Duan et al. |
| 2013/0121584 A1 | 5/2013 | Bourdev et al. |

FOREIGN PATENT DOCUMENTS

| | | | |
|---|---|---|---|
| CN | 101694657 | | 4/2010 |
| CN | 101782904 | | 7/2010 |
| CN | 101826102 A | * | 9/2010 |
| EP | 1103900 | | 5/2001 |
| JP | 2007134934 A | * | 5/2007 |

OTHER PUBLICATIONS

Vlachos, et al., "Effective Ways for Querying Images by Content over the Internet", 10th Mediterranean Electrotechnical Conference, May 29-31, 2000, IEEE, vol. 1, pp. 337-340.

* cited by examiner

IMAGE SEARCHING

CROSS REFERENCE TO RELATED PATENT APPLICATIONS

This application claims foreign priority to Chinese Patent Application No. 201110380442.X filed on 25 Nov. 2011, entitled "Image Searching Method and Apparatus," which is hereby incorporated by reference in its entirety.

TECHNICAL FIELD

The present disclosure relates to the field of network search technology and, more specifically, to a method and an apparatus for searching images.

BACKGROUND

With the application and development of image searching technology, the image searching technology based on visual feature is the main stream image searching technology. Implementation of the image searching technology based on visual features requires pre-establishing a visual feature based image searching database. Specifically, FIG. 1 illustrates a flowchart of an example method for establishing the visual feature based image searching database.

At 102, a feature extraction system is established. The feature extraction system defines visual feature templates to be extracted from images.

At 104, visual features are extracted from multiple images in the image searching database by utilizing the established feature extraction system. An image may be represented by one or more visual features extracted from the image.

At 106, the visual features corresponding to each image are used as index keyword to establish an inverted index to generate the visual feature based image searching database. The workflow of establishing the visual feature based image searching database is thus completed.

Based on the operations from 102 to 106, the visual feature based image searching database is established. A server may perform image searching based on the visual feature based image searching database. FIG. 2 illustrates a flowchart of an example method for searching images in the image searching database by the server.

At 202, the server receives an image searching request submitted by a client terminal. At 202, the server may include the visual feature based image searching database or the server may access the visual feature based image searching database. The image searching request includes an image for a search that a user requests.

At 204, the server extracts visual features from the image for the search received in the image searching request. At 204, the method that the visual features are extracted from the image for search may be the same as the method that the visual features are extracted from the image when the visual feature based image searching data base is established.

At 206, the server based on the extracted visual features, according to the established invert index, searches a set of images corresponding to the extracted visual feature from the visual feature based image searching database.

At 208, the server sends search results to the client terminal that sends the image searching request. The operation that the server searches images is then complete.

Based on the operations from 204 to 208, the server returns a set of images requested by the user based on the visual feature based image searching database.

In actual applications, the above visual feature based image searching technology may be implemented through creating a new visual feature based searching engine instead of using text searching engines that servers with searching functions are normally equipped with. Accordingly, the server resources cannot be effectively utilized.

SUMMARY

This Summary is provided to introduce a selection of concepts in a simplified form that are further described below in the Detailed Description. This Summary is not intended to identify all key features or essential features of the claimed subject matter, nor is it alone intended to be used as an aid in determining the scope of the claimed subject matter. The term "techniques," for instance, may refer to device(s), system(s), method(s) and/or computer-readable instructions as permitted by the context above and throughout the present disclosure.

The present disclosure provides a method and an apparatus for image searching. The present techniques may improve a utilization rate of server resources.

The present disclosure provides a method for image searching. With respect to each image in an image searching database, a respective label of a respective image is generated based on description information corresponding to the respective image. A corresponding relationship between the generated respective label and the respective image is stored. The method for searching image may include the following operations.

Based on a received image searching request, description information corresponding to an image for search in the image searching request is obtained.

Based on the description information of the image for search, the label of the image for search is generated. The method for generating the label of the image for search is the same as or substantially similar to the method for generating the respective label of each image in the image searching database.

Based on the stored corresponding relationship between the respective labels and the respective images, one or more images corresponding to the label of the image for search are determined. The determined one or more images are sent to the client terminal that sends the image searching request.

The present disclosure also provides an apparatus for image searching. The apparatus may include a corresponding relationship generation unit, a description information retrieval unit, a label generation unit, an image determination unit, and an image supply unit.

The corresponding relationship generation unit, with respect to each image in an image searching database, generates a respective label of a respective image based on description information corresponding to the respective image and stores a corresponding relationship between the generated respective label and the respective image. The method for searching image may include the following operations.

The description information retrieval unit, based on a received image searching request, obtains description information corresponding to an image for search in the image searching request.

The label generation unit, based on the description information of the image for search obtained by the description information retrieval unit, generates the label of the image for search. The method for generating the label of the image for search is the same as or substantially similar to the method for generating the respective label of each image in the image searching database.

The image determination unit, based on the stored corresponding relationship between the respective labels and the respective images, determines one or more images corresponding to the label of the image for search generated by the label generation unit. The image supply unit sends the determined one or more images to the client terminal that sends the image searching request.

At least one of the present techniques provided in the present disclosure may firstly, with respect to each image in the image searching database, generate the respective label of the respective image based on description information corresponding to the respective image and store a corresponding relationship between the generated respective label and the respective image. The present techniques may, based on an image searching request, obtains description information corresponding to an image for search in the image searching request. The present techniques may then, based on the description information of the image for search, generate the label of the image for search. The method for generating the label of the image for search is the same as or substantially similar to the method for generating the label of each image in the image searching database.

Further, the present techniques may, based on the stored corresponding relationship between the respective labels and the respective images, determine one or more images corresponding to the label of the image for search, and send the determined one or more images to the client terminal that sends the request for image searching.

In the present techniques, the label of the corresponding image generated based on description information of the image may be in a form of text. Thus, the label based image searching may utilize the existing text searching engine, thereby improving the utilization rate of the server resources.

BRIEF DESCRIPTION OF THE DRAWINGS

To better illustrate embodiments of the present disclosure, the following is a brief introduction of figures to be used in descriptions of the embodiments. It is apparent that the following figures only relate to some embodiments of the present disclosure and shall not be used to restrict the present disclosure. A person of ordinary skill in the art can obtain other figures according to the figures in the present disclosure without creative efforts.

DETAILED DESCRIPTION

The present disclosure provides a method and an apparatus for searching images. The present techniques may improve the utilization rate of server resources. The present techniques may be applied in the process of image searching and be implemented either as a method or an apparatus. The following is a detailed description of the present techniques by reference to the FIGs. The described embodiments herein are example embodiments and should not be used to restrict the scope of the present disclosure.

The present disclosure provides a method for searching images in accordance with a first example embodiment of the present disclosure. The method may be used in a server with information searching functionalities on the Internet to use a text searching engine of the server to conduct image searching, thereby improving the utilization rate of the server resources.

The method for searching images in the first example embodiment may pre-establish a label for each image in an image searching database as a basis for the server to search images. The text searching engine in the server may thus be used to conduct image searching. The following description describes two examples of establishing the label for each image.

Figure 1:
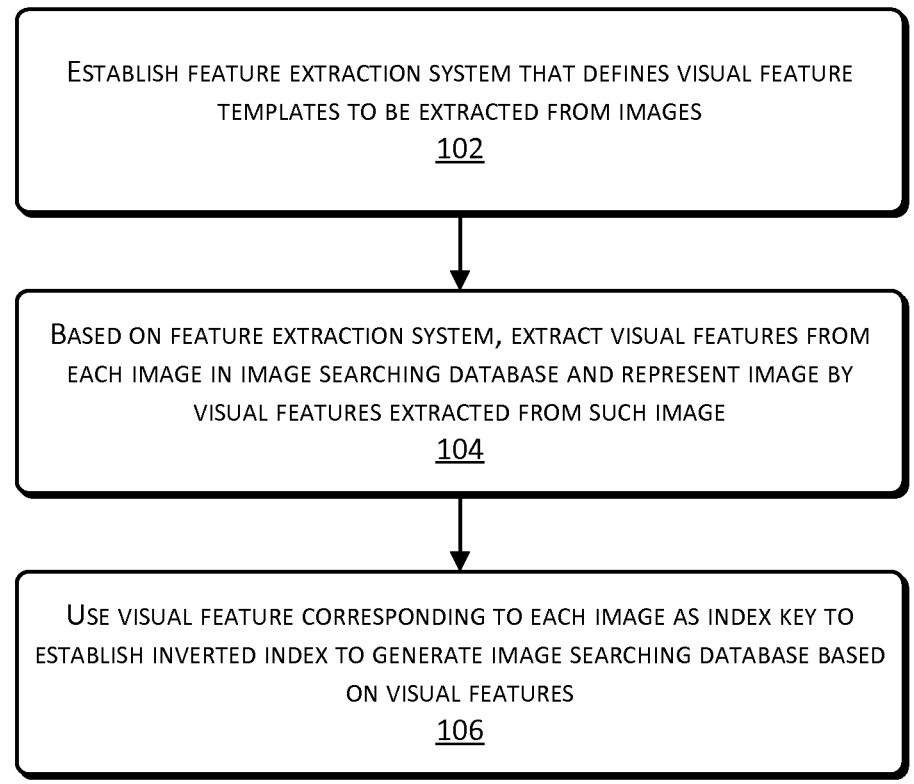
FIG. 1 illustrates a flowchart of an example method for establishing a visual feature based image searching database.
Figure 2:
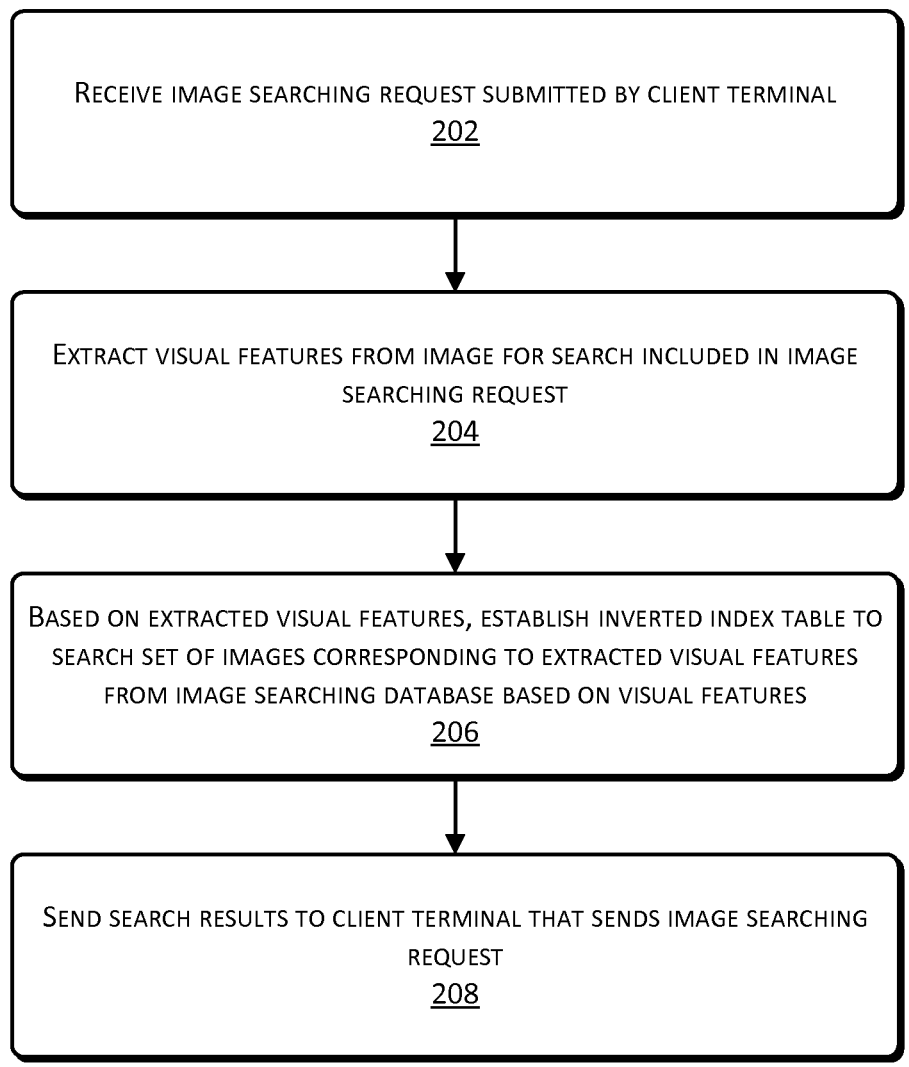
FIG. 2 illustrates a flowchart of an example method for searching images in the image searching database by a server.
Figure 3:
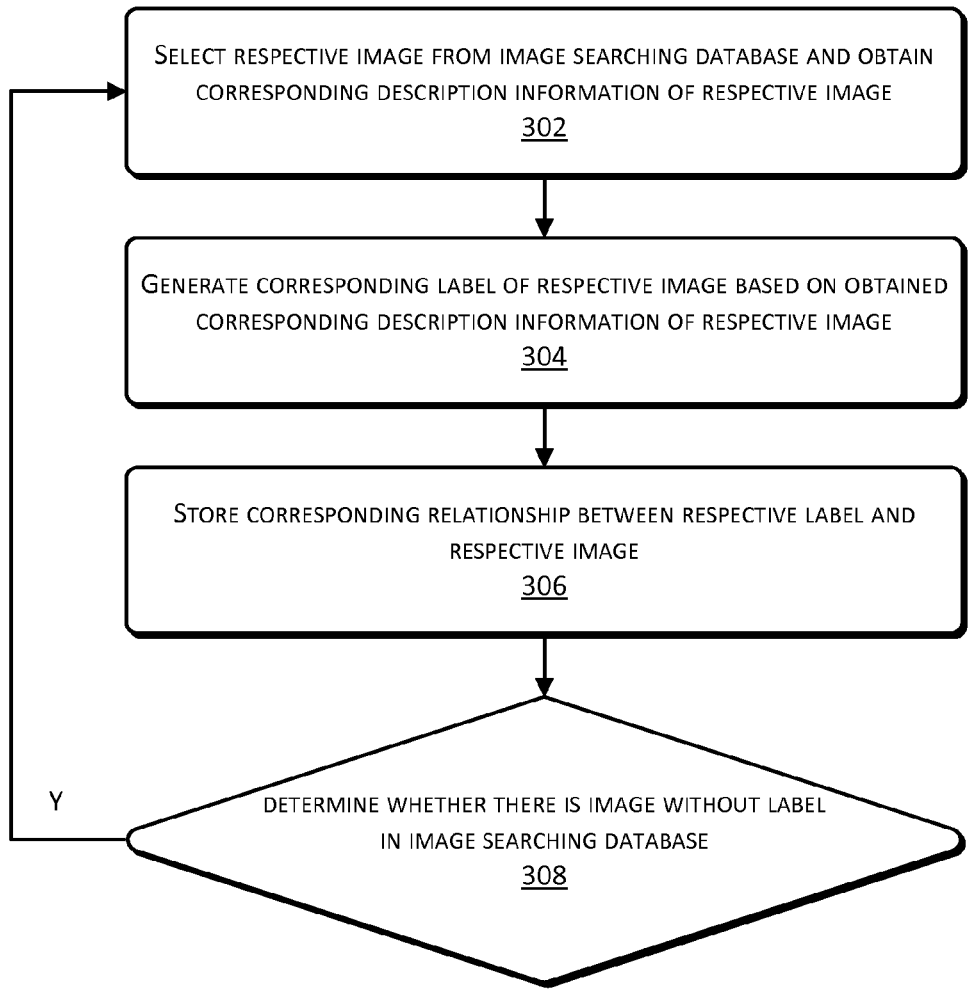
FIG. 3 illustrates a flowchart of an example method for generating a label for each image in the image searching database.

In one example of establishing the label for each image, a respective label is established for each image in the image searching database and a corresponding relationship between respective labels and respective image is stored. FIG. 3 illustrates a flowchart of an example method for generating a label for each image in the image searching database. At 302, a respective image is selected from the image searching database and description information of the respective image is obtained. The process to obtain the description information of the respective image may be as follows. An entity corresponding to the respective image is determined and description information of the entity is used as the description information of the respective image. For instance, the description information of the respective image mainly describes attributes of the entity corresponding to the respective image. The description information of the respective image may generally include the description information of the entity. The entity corresponding to the respective image may include particular contents contained in the respective image. For instance, in the e-commerce field, the entity corresponding to the respective image may generally be a product. Correspondingly, the description information of the image may include various description information of the product, such as a product name, product attribute (such as actual color, actual size, etc.), product usage, product category, etc.

At 304, the respective label of the respective image is generated based on the description information of the obtained respective image. At 302, the description information of the respective image is generally in a form of text.

Correspondingly, the respective label generated based on the description information of the respective image is generally also in the form of text. The respective label is mainly used to identify an attribute characteristic of the entity corresponding to the respective image. For instance, one label may correspond to different images.

At 306, the corresponding relationship between the generated respective labels and the respective images is stored. For instance, a method for indexing may be used to store the corresponding relationship to improve a speed of searching images. The respective labels corresponding to the respective images in the image searching database may be used as an index. An inverted indexing method may be used to store the corresponding relationship between the respective labels and the respective images. It should be understood that the methods described herein to store the respective labels and the respective image are just examples. Different storing methods may be flexibly set to store such corresponding relationship such as a table or a list and are not listed herein.

At 308, it is determined whether there is an image without a generated label in the image searching database. If a result of determination is positive, the process returns to operations at 302. Otherwise, the process is terminated.

At 308, the determination whether there is an unlabeled image in the image searching database is to determine whether there is an unselected image in the image searching database. The process to establish an index for images in the image searching database is thus completed.

Through the operations of 302 to 308, the respective labels of corresponding respective images in the image searching database are generated and the corresponding relationship between the respective labels and the respective images is stored.

The following description describes a second example of establishing the label for each image. In addition to generating the label for each image in the image searching database, one or more respective visual features in the respective image are further extracted. When the corresponding relationship between the respective label and the respective image is stored, a corresponding relationship between the respective visual features and the respective label is also stored. The corresponding relationship between the respective label generated for the respective image, the respective image corresponding to the respective label, and the respective visual features extracted from the respective image is stored.

Figure 4:
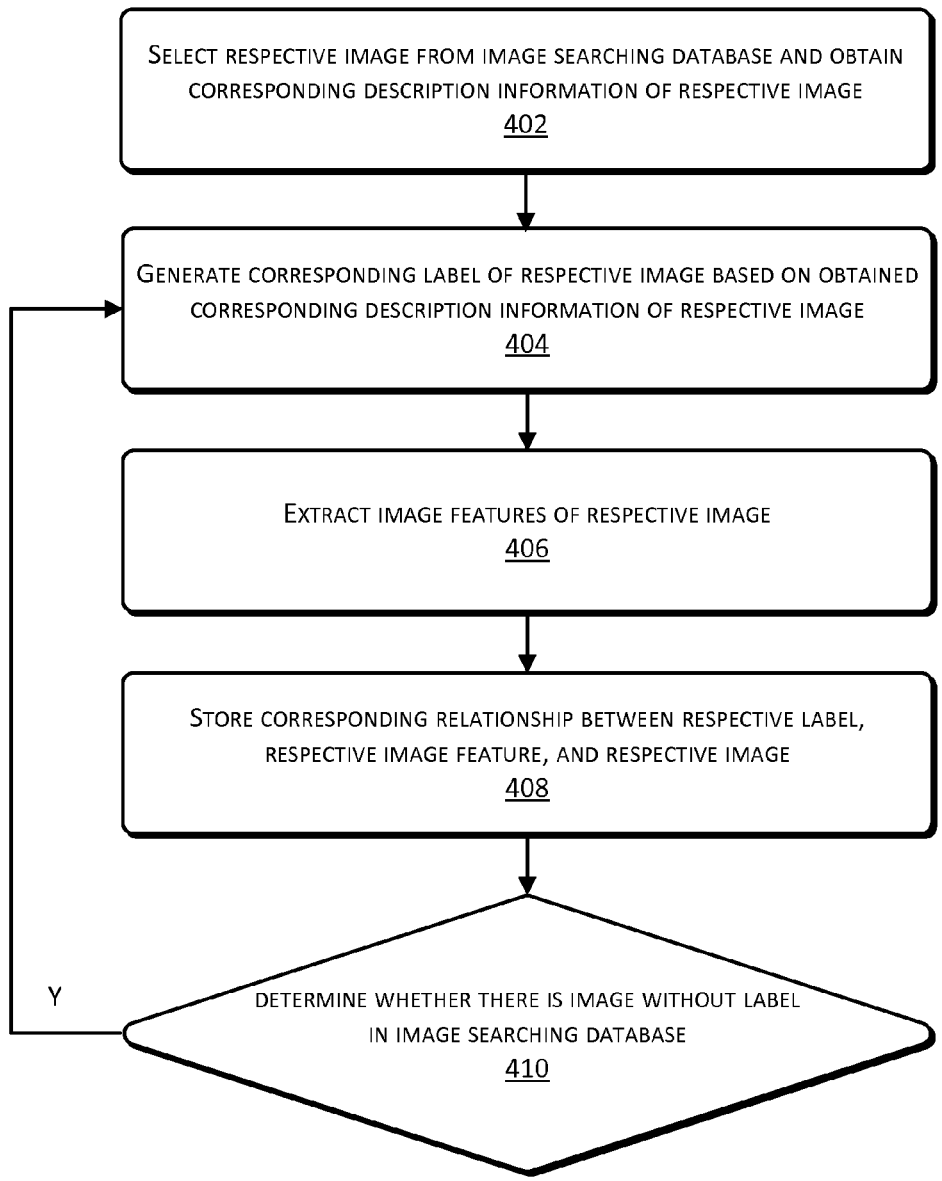
FIG. 4 illustrates a flowchart of another example method for generating the label for each image in the image searching database.

FIG. 4 illustrates a flowchart of another example method for generating a label for each image in the image searching database.

At 402, a respective image is selected from the image searching database and description information of the respective image is obtained. The operations at 402 are substantially the same as or similar to the operations at 302 and are thus not detailed herein.

At 404, the label of the respective image is generated based on the description information of the obtained respective image. The operations at 404 are substantially the same as or similar to the operations at 304 and are thus not detailed herein.

At 406, one or more image features of the respective image are extracted. The image features of the respective image may be extracted based on a preset image feature template. The image features may include visual features of the respective image or any other information representing the respective image such as a screenshot of the respective image. The detailed extraction process may be implemented through image processing techniques.

In one example, the operations at 404 and 406 may have no sequence order such that the operations at 404 and 406 may be performed in parallel or the operations at 406 may be performed prior to the operations at 404.

At 408, the corresponding relationship between the respective label generated for the respective image, the respective one or more image features extracted from the respective image, and the respective image is stored. At 408, the corresponding relationship between the respective label generated for the respective image, the respective one or more image features extracted from the respective image, and the respective image may be stored through indexing to increase the speed of searching images. For instance, the respective labels corresponding to the respective images in the image searching database may be used as an index. The inverted indexing method may be used to store the corresponding relationship between the respective label generated for the respective image, the respective one or more image features extracted from the respective image, and the respective image. It should be understood that the methods described herein to store the respective label and the respective image are just examples. Different storing methods may be flexibly set to store such corresponding relationship such as a table or a list and are not listed herein.

At 410, it is determined whether there is an image without a generated label in the image searching database. If a result of the determination is positive, the process returns to the operations at 402. Otherwise, the process is terminated. The process to establish the index for each image in the image searching database is completed.

Through the operations of 402 to 410, the respective label is generated and the respective image feature is extracted for each image in the image searching database, and the corresponding relationship between the respective generated label, the respective extracted image features and the respective image is stored.

The above first and second example methods for creating the respective label for each image in the image searching database may be implemented by the server with searching functionalities, the image searching database, or other entities with functionalities to access the image searching database.

Figure 5:
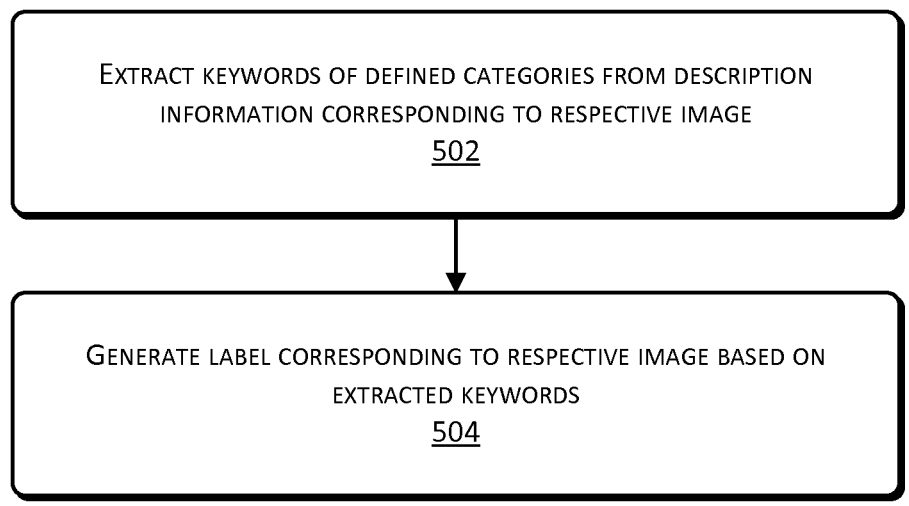
FIG. 5 illustrates a flowchart of another example method for generating the label corresponding to the image.

The present disclosure further provides examples to implement the operations at 304 and operations at 404. Based on the obtained description information of the respective image, the respective label is generated for the respective image. FIG. 5 illustrates a flowchart of another example method for generating the label corresponding to the image.

At 502, one or more keywords for a category are extracted from the description information of the respective image. For example, the keywords to be extracted from the obtained description information to generate the label may be set based on the categories of the respective entity corresponding to the respective image. For instance, the description information of an entity with a category of product may include a product name, a product attribute, a product usage, a product classification, etc. The product name and the product attribute may be set as keywords to be extracted from the description information of the respective image and be used to extract information corresponding to the product name and the product attribute. It should be understood that the above is just an example for extracting the above keywords for generation of the label from the description information corresponding to the respective image. In some examples, based on a specific type of the respective entity corresponding to the respective image, different keywords may be set to be extracted from the description information of the images, which are not detailed herein.

At 504, the respective label corresponding to the respective image is generated based on the extracted keywords. At 504, an algorithm to generate the respective label of the respective image may be preset to generate the respective label based on the keywords extracted from the description information. In the applications, the algorithm may be flexibly set. The process to generate the label corresponding to the image is completed.

Figure 6:
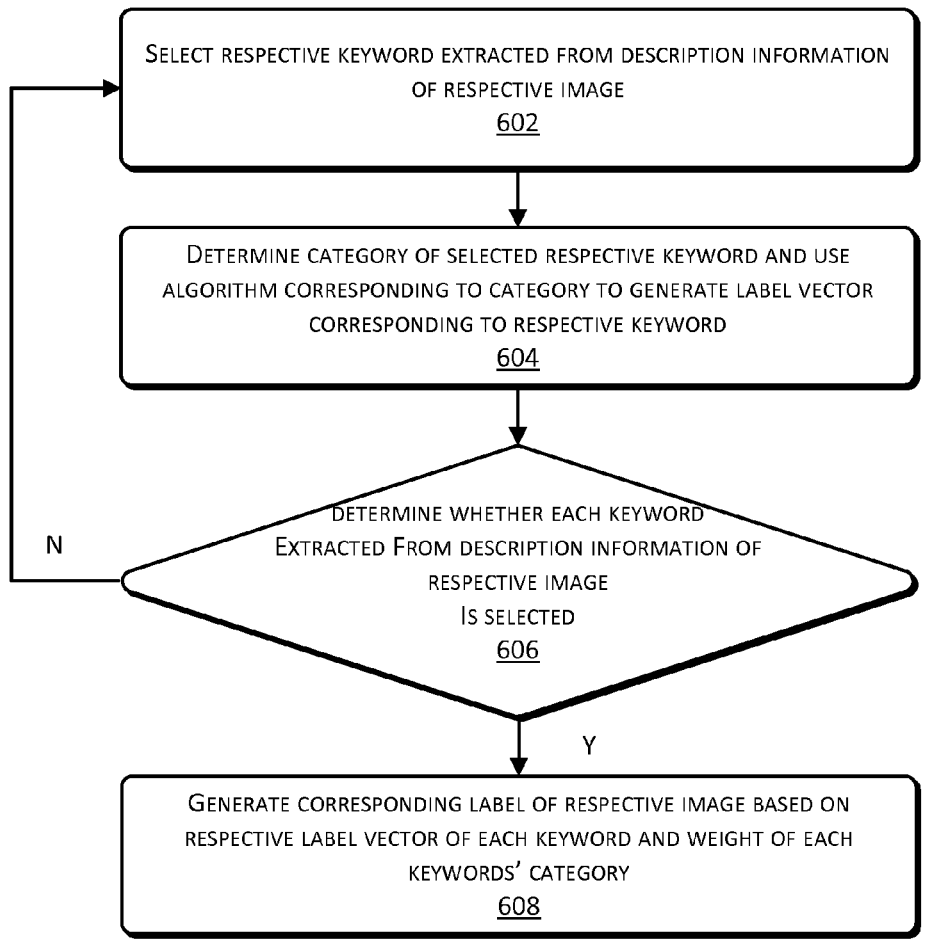
FIG. 6 illustrates a flowchart of an example method for generating the label corresponding to the image based on the keywords extracted from description information of the image.

The first example embodiment of the present disclosure may provide more examples at 502 to generate the respective label corresponding to the respective image based on keywords extracted from the description information of the respective image. FIG. 6 illustrates a flowchart of an example method for generating the respective label corresponding to the respective image based on the keywords extracted from the description information of the respective image.

At 602, a keyword is selected from the keywords extracted from the description information of the respective image. For example, at 602, the selected keyword may be randomly selected from all extracted keywords, or selected according to a preset order.

At 604, a category of the selected keyword is determined and a label vector corresponding to the keyword is generated based on an algorithm corresponding to the category of the keyword. For example, the algorithm corresponding to the category of the keyword may be flexibly set, such as a normalization of the extracted keyword, a sample processing of information corresponding to the keyword, etc. The present disclosure does not impose restrictions.

At 606, it is determined whether each keyword extracted from the description information of the respective image is selected. If a result of the determination is positive, operations at 608 are performed. Otherwise, the process returns to operations at 602.

At 608, the respective label of the respective image is generated based on each label vector corresponding to each keyword and a weight value of each keyword's category. For example, when the respective label is generated, the label vector of each keyword is multiplied with its weight and products of respective label vectors with respective weights for all keywords are added to determine the respective label corresponding to the respective image. In another example, the respective label corresponding to the respective image is determined by the average value of respective label vectors of all keywords multiple with their respective weight. In some other examples, the algorithm to generate the respective label corresponding to the respective image may be flexibly set based on the label vector corresponding to each keyword and the weight of each keyword's category. For instance, a respective weight of a respective category may be set as 1, which represents that the respective category does not require weighted processing.

The process to extract the keywords from the corresponding description information of the image to generate the label of the image is completed.

Figure 7:
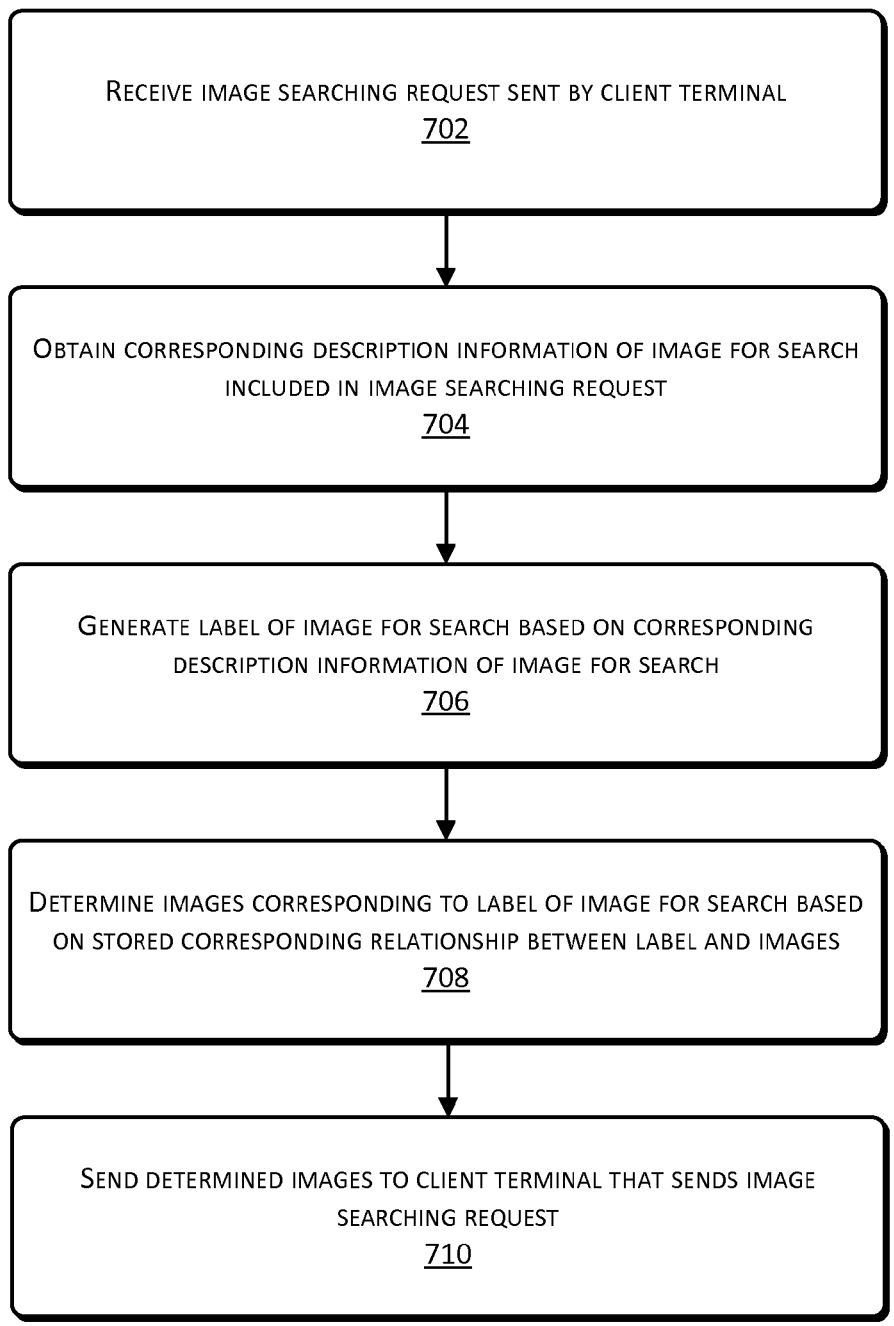
FIG. 7 illustrates a flowchart of an example method for searching images performed by a server.

After the labels are generated for the images in the image searching database and the corresponding relationships between the labels and the images are stored in accordance with techniques in the above example embodiments, the server may perform image searching based on the corresponding relationships. FIG. 7 illustrates a flowchart of an example method for searching images performed by a server.

At 702, the server receives an image searching request from a client terminal. The image searching request may generally include an image requested by a user for search (an image for search).

At 704, based on the received image searching request the server obtains corresponding information of the image for search included in the image searching request. The operations at 704 that the server obtains the corresponding information of the image for search are generally the same as or similar to the operations at 302 to obtain the corresponding description information of the selected images. Thus details are not described herein.

At 706, a label of the image for search is generated based on the description information corresponding to the image for search. The operations at 706 to generate the label of the image for search are generally the same as or similar to the operations at 304 to generate the labels of the images in the image searching database. Thus details are not described herein.

At 708, one or more images corresponding to the label of the image for search are determined based on the stored corresponding relationship between the labels and the images. For example, based on the label of the image for search, the stored corresponding relationship between the labels and the images is searched to find the one or more images corresponding to the label of the image for search. The stored corresponding relationship between the labels and the images may be the stored corresponding relationship established in accordance with the first example of creating labels or the stored corresponding relationship established in accordance with the second example of creating labels.

At 710, the server sends the determined one or more images to the client terminal that sends the image searching request. Before the server sends the determined images to the client terminal at 710, the server may process the determined images based on one or more preset rules. The preset rules may be flexibly set up. For example, the preset rules may be set by the server or by the client terminal. The preset rules may be a ranking of the determined images based on their resolutions from high to low or a ranking of the images based the attributes of the entities corresponding to the images from high to low. Details are not described herein.

Based on the above process, the server may conduct searching images based on the label of the image for search. As the respective label is generated based on the description information corresponding to the respective image, the label is generally in the form of text. Thus, the present text search engines of the server may be used to perform searching images, thereby improving the utilization rate of the server resources.

In the above image searching process, the corresponding relationship between the labels and the images for the image searching may be the corresponding relationship established in accordance with the first example method for creating labels or the corresponding relationship established in accordance with the second example method for example of creating labels.

Figure 8:
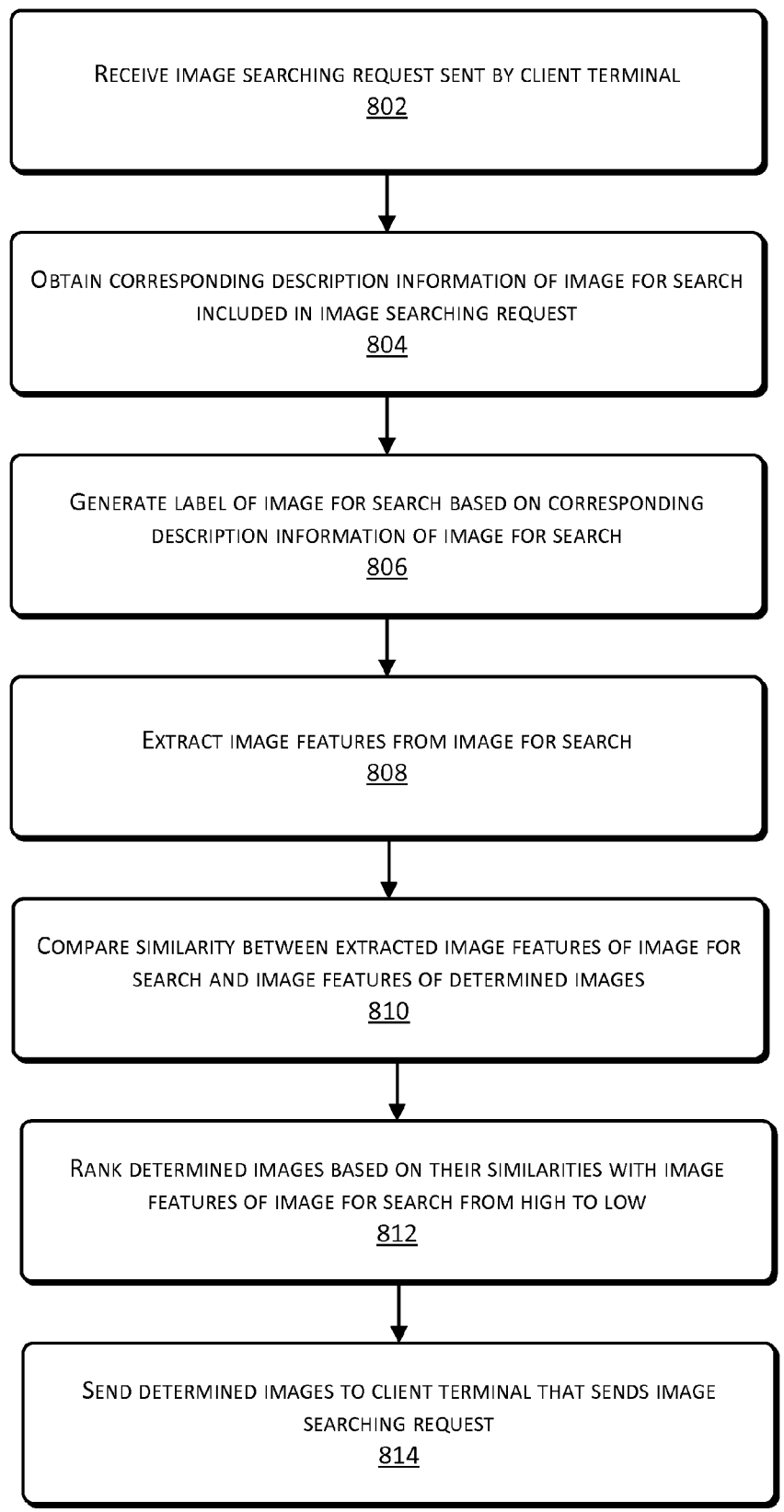
FIG. 8 illustrates a flowchart of another example method for searching images by the server.

The first example embodiment of the present disclosure provides a method for searching images. The method for generating labels for the images in the image searching database may be based on the corresponding relationship generated in accordance with the second example of creating labels. FIG. 8 illustrates a flowchart of another example method for searching images by the server.

At 802, the server receives an image searching request from a client terminal. The image searching request may generally include an image for search.

At 804, based on the received image searching request, the server obtains corresponding information of the image for search included in the image searching request. The operations at 804 that the server obtains for the corresponding information of the image for search are generally the same as or similar to the operations at 302 to obtain the corresponding description information of the selected images. Thus details are not described herein.

At 806, a label of the image for search is generated based on the description information corresponding to the image for search. The operations at 806 to generate the label of the image for search are generally the same as or similar to the operations at 304 to generate the labels of the images in the image searching database. Thus details are not described herein.

At 808, the server extracts one or more image features of the image for search. The operations at 808 to extract the image features from the image for search are generally the same as or similar to the operations at 406 to generate the image features of the respective image. Thus details are not described herein. In addition, the operations at 808 may be performed prior to the operations at 804 or 806.

At 810, the server performs a similarity degree comparison between the extracted image features of the image for search and the image features of one or more determined images respectively. For example, the one or more image corresponding to the label of the image for search may be determined based on the stored corresponding relationship between the labels and the images.

At 812, the determined images are ranked from high to low based on their similarity degrees between the determined images and the image for search respectively.

At 814, the server sends the determined images to the client terminal that sends the image searching request. The operations at 814 are generally the same as or similar to the operations at 710. Thus details are not described herein.

Based on the above process, the server may conduct searching images based on the label of the image for search. As the respective label is generated based on the description information corresponding to the respective image, the label is generally in the form of text. Thus, the present text search engines of the server may be used to perform searching images, thereby improving the utilization rate of the server resources. In addition, as the return result to the client terminal is processed based on the ranking of similarity degrees, the images most relevant to the image search may be represented to the client with priority.

A second example embodiment of the present disclosure provides an example application scenario to generate the labels. An e-commerce website may have an information database with a large volume of product information. Each product may have description information in a form of text. The text description information has a relatively strong correlation with the image of the product as they are both descriptions of the product. The text description information of the product may be equivalent to the description information of the image of the product. Thus, the text label may represent contents of the image. The product image searching may search the relevant images based on the text labels and then rank the images based on their similarity degrees.

The text description information (such as the brief description, keyword, classification, attribute, etc.) corresponds to the product and may also include labels manually added after human review. This example embodiment of the present disclosure extracts keywords from such description information to generate text labels. In some example, these text labels may be ranked according to their relativity degrees. In one example, a set of labels including labels of different dimensions of the product form a vector space. The dimensions may be the categories set at 502 as shown in FIG. 5 of the first example embodiment of the present disclosure. For the convenience of the following description, some symbols are defined as below.

T represents a text label of the product.

T1 represents a label generated based on a label manually added for the product.

T2 represents a label generated based on brief description in the product.

T3 represents a label generated based on a keyword of the product.

T4 represents a label generated based on a classification of the product.

T5 represents a label generated based on an attribute of the product.

w1, w2, w3, w4, w5 represents a respective weigh of T1, T2, T3, T4, and T5.

The text label of the product may be calculated based on the following formula:

$$T = w1*T1 + w2*T2 + w3*T3 + w4*T4 + w5*T5$$

The label manually added for the product, the brief description in the product, the keyword of the product, the classification of the product, and the attribute of the product correspond to the categories set up at 502.

Figure 9:
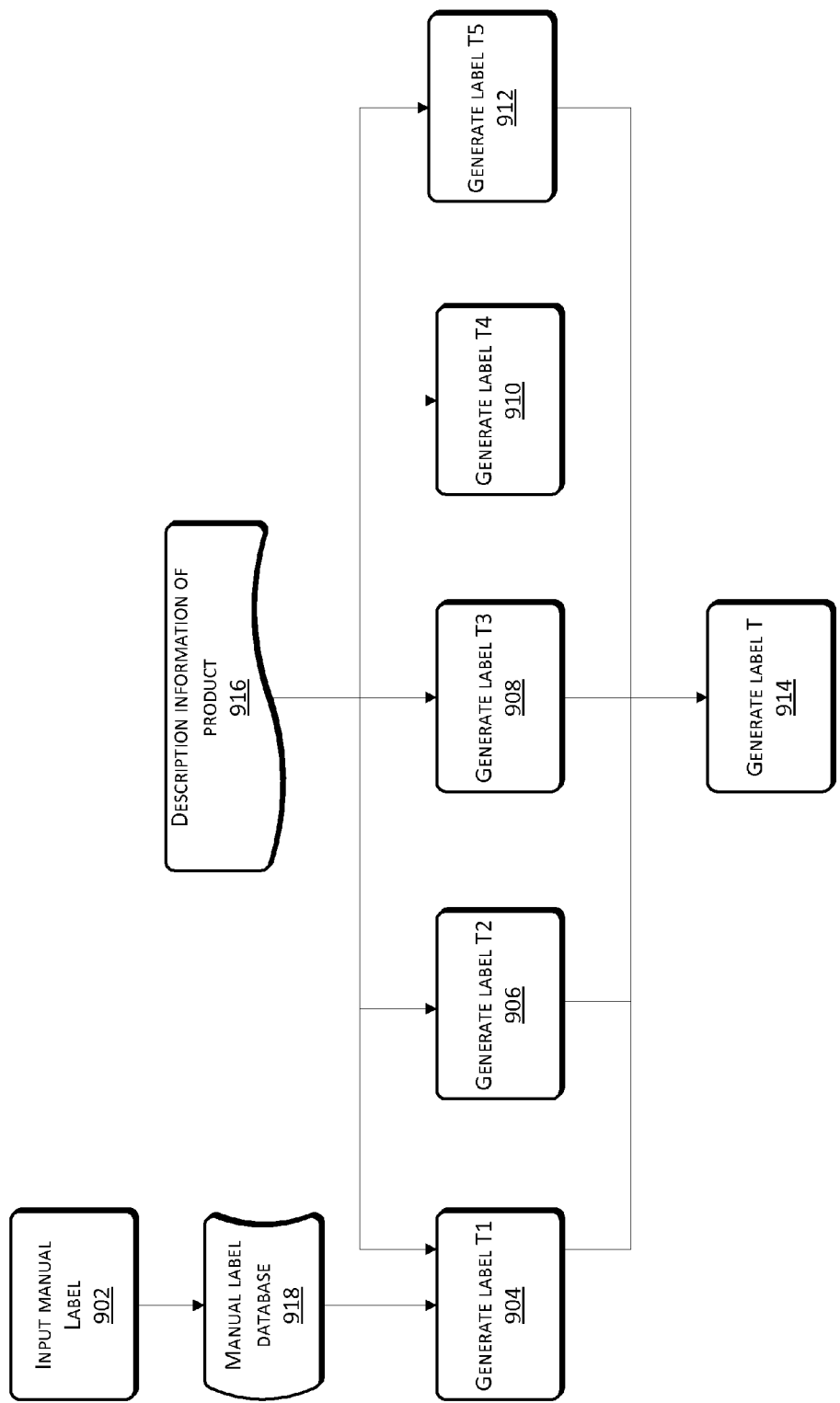
FIG. 9 illustrates a flowchart of an example method for extract a text label of a product in accordance a second example embodiment of the present disclosure.

FIG. 9 illustrates a flowchart of an example method for extract a text label of a product in accordance with the second example embodiment of the present disclosure.

At 902, a manual label is input. For various reasons, the user's filled-in information for products on the e-commerce website are often informal and often cause errors by machine identification. Thus, there are labels marked manually by humans after they review the product information. The manual label is input into the system as a correction to automatic labeling by machine. A product may have multiple labels which are input based on their relativities from high to low. For example, the product ID may be used as the index key and the set or sequence of the labels may be used as the index values. Such index keys and index values may be stored in a high performance searching data structure, such as a Trie database. At 904, the manual label is searched according to the product ID and the label T1 is generated based on the manual label. The operations at 904 may correspond to operations at 604. For example, when the manual labels are input, the manual labels have been ranked from high to low according to their relativities. The calculation formula of T1 may be as follows:

$$T1 = 1/\log(\text{rank}+1),$$

wherein rank represents a ranking of a respective label according to relativities of the labels. Based on the above formula, the ranking is normalized to the label T1.

At 906, the label T2 is generated based on the brief descriptions of the product. The operations at 906 may correspond to the operations at 604. For example, the brief description of the product may be short. Natural Language Processing (NPL) may be used to pre-process the brief description to obtain three kinds of words (core word, noun, and other words). Each word may be used as a label. The sequence of importance of the words is: core word>noun>other word. A weight value may be set for each type based on experiences.

Label $T2$=category weight*appearance of word frequency of respective word in such category The label T2 is then obtained through normalization.

At 908, the label T3 is generated based on the keyword of the product. The operations at 908 correspond to the operations at 604. For example, the user may fill in multiple keywords. Each keyword may have a short length. The sequence of filling-in is treated as an importance sequence from high to low based on the statistics. For example, the formula of calculation of importance may be as follows:

1/log(rank+1)

Natural Language Processing (NPL) may be used to pre-process each keyword to obtain three kinds of words (core word, noun, and other words). Each word may be used as a label. The sequence of importance of the words is: core word>noun>other word. A weight value may be set for each type based on experiences.

Label $T3$=ranking weight*category
weight*appearance of word frequency of respective word.

The label T3 is then obtained through normalization.

At 910, the label T4 is generated based on the classification of the product.

The operations at 910 may correspond to the operations at 604. For example, each product belongs to a classification system. The classification system has a hierarchy. The respective labels may be extracted from the classification name of each level of hierarchy. The more detailed the classification the more important the respective label. For example, the calculation formula of importance level of the label in the hierarchy may be as follows:

1/log(grain+1)

The grain=1, 2 . . . n, wherein n may be any integer. The smaller the value the more detailed the grain is.

Label $T4$=importance score of a hierarchy
level*appearance of word frequency of respective word.

The label T4 is obtained through such normalization.

At 912, the label T5 is generated based on the attribute of the product. The operations at 912 may correspond to the operations at 604. For example, the product may have multiple attribute dimensions. Each attribute dimension corresponds to a respective label. The importance score of each label may be the same, and normalized to obtain the label vector T5.

For example, in the above operations, except that operations at 902 and 904 may have sequence order, operations from 904 to 912 may be independent. The operation number may be used to differentiate each other.

At 914, the text label T of the product is generated based on various labels.

The operations at 914 may correspond to operations at 606. For example, the label T may be determined based on the above formula:

$T=w1*T1+w2*T2+w3*T3+w4*T4+w5*T5$

After the label T of the product is determined, the corresponding relationship between the label T and the product is stored.

As shown in FIG. 9, the source of keywords that generate the labels T1, T2, T3, T4, and T5 may come from description information of the product 916. The manual label input at 902 may be stored at a manual label database 918. T1 is generated based on one or more manual labels from the manual label database 918.

In addition, based on the above processing, the image features may be further extracted from the product image. For example, the image processing techniques may be used to extract image features (such as a shape feature, a color feature, a portion feature, a distributive feature, etc.) The image processing techniques may be referenced to the conventional image processing techniques.

After the label corresponding to the image is determined and the image feature is extracted, their corresponding relationship with the image may be saved. For example, an index may be established. The text label and the image features may be included into the index. The text label may be used as a key of an inverted index and the image content together with the product ID may be used as a value of the index.

The text label generation method as described in this example embodiment of the present disclosure may be applicable to a scenario where each entity corresponds to an image and text description information and the text description information and the image both describe a single concept. In the example of an e-commerce file, such a concept is a product. In applications, for example, the user may click an image. The serve may respond by searching related text description information, generating text labels, using the text searching engine to search related products based on the text labels, and ranking the found images based on similarities.

A third example embodiment of the present disclosure provides an apparatus for searching images. For example, the apparatus for searching images may be located at a searching server. The apparatus for searching images at the searching server may improve the resource utilization rate of the server.

Figure 10:
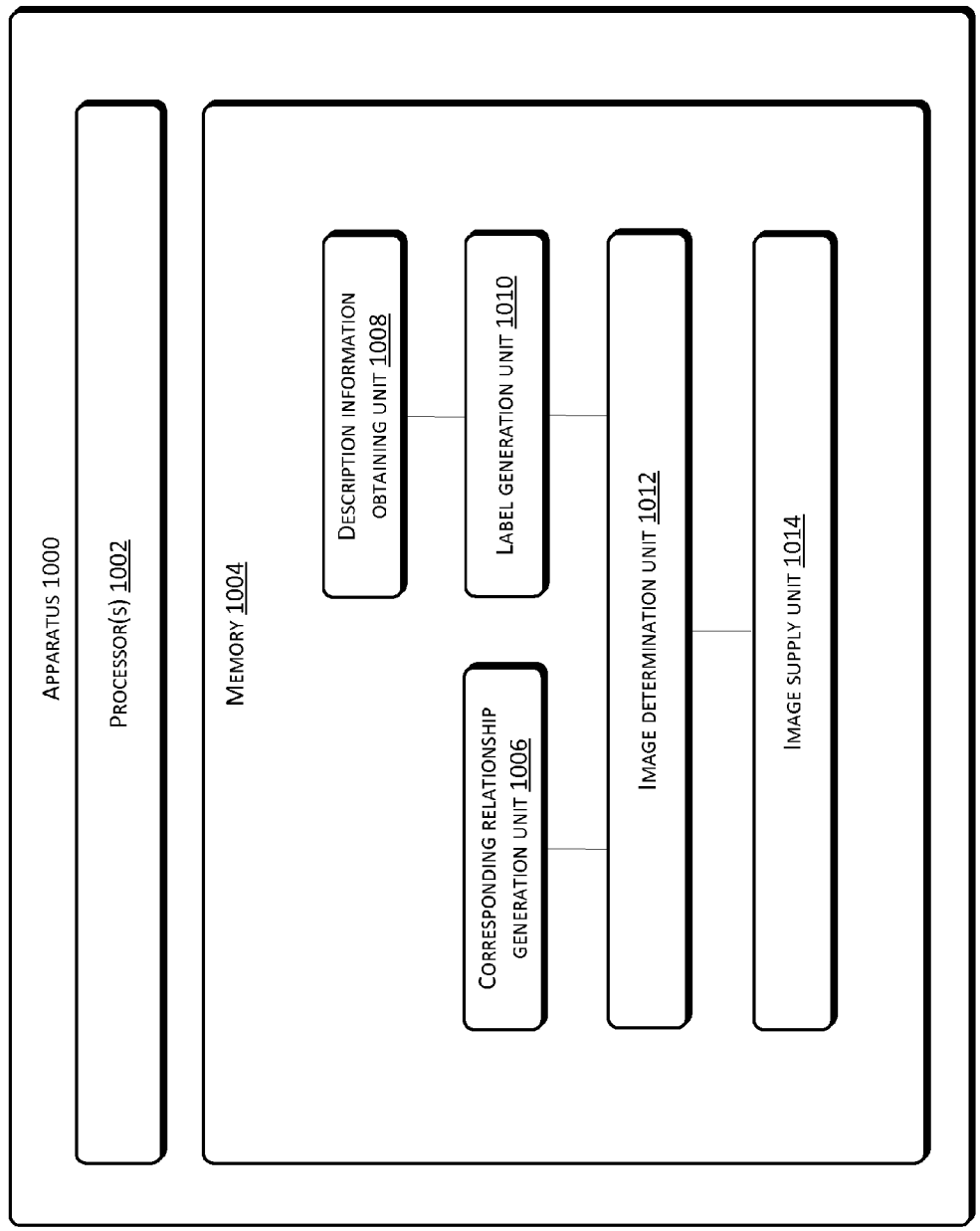
FIG. 10 illustrates a diagram of an example apparatus for searching images in accordance with a third example embodiment of the present disclosure.

FIG. 10 illustrates a diagram of an example apparatus for searching images in accordance with the third example embodiment of the present disclosure. The apparatus may include software, hardware, or a combination thereof. In an example configuration, the apparatus 1000 in FIG. 10 may include one or more processor(s) 1002 and memory 1004. The memory 1004 is an example of computer storage media.

Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include transitory media such as modulated data signals and carrier waves.

The memory 1004 may store therein program units or modules and program data. In the example of FIG. 10, the memory 1004 may store therein a corresponding relationship generation unit 1006, a description information obtaining unit 1008, a label generation unit 1010, an image determination unit 1012, and an image supply unit 1014.

The corresponding relationship generation unit 1006, with respect to each image in an image searching database, generates a respective label of a respective image based on description information of the respective image, stores a corresponding relationship between the respective label and the respective image.

The description information obtaining unit 1008, based on an image searching request, obtains corresponding description information of an image for search included in the image searching request.

The label generation unit 1010, based on the description information corresponding to the image for search obtained by the description information obtaining unit 1008, generates a corresponding label of the image for search. The method for generating the label of the image for search may be the same as the method for generating the labels of the images in the image searching database by the corresponding relationship generation unit 1006.

The image determination unit 1012, based on the corresponding relationship between the respective label and the respective image that is stored by the corresponding relationship generation unit 1006, determines one or more images that correspond to the label of the image for search generated by the label generation unit 1010.

The image supply unit 1014 sends the one or more images determined by the image determination unit 1012 to a client terminal that sends the image searching request.

In an example, the description information obtaining unit 1008 may, based on the image for search included in the image searching request, determine an entity corresponding to the image for search and obtain description information of the entity as the description information of the image for search.

In an example, the label generation unit 1010 may extract keywords of defined categories from the description information of the image for search and generate the label of the image for search based on the extracted keywords.

In another example, the label generation unit 1010 may, based on the extracted keyword of each defined category, use an algorithm corresponding to the defined category to generate a label vector corresponding to the keyword, and generate the label of the image for search based on the label vector corresponding to each keyword and a weight value of each category of the keyword.

In an example, the corresponding relationship generation unit 1006 may use the generated label of each image as the index and use an inverted index to store the corresponding relationship between the labels and the images.

In another example, the corresponding relationship generation unit 1006 may extract image features of each image in the image searching database and store the corresponding relationship between the stored label, the image corresponding to the label, and the image feature extracted from the image.

Figure 11:
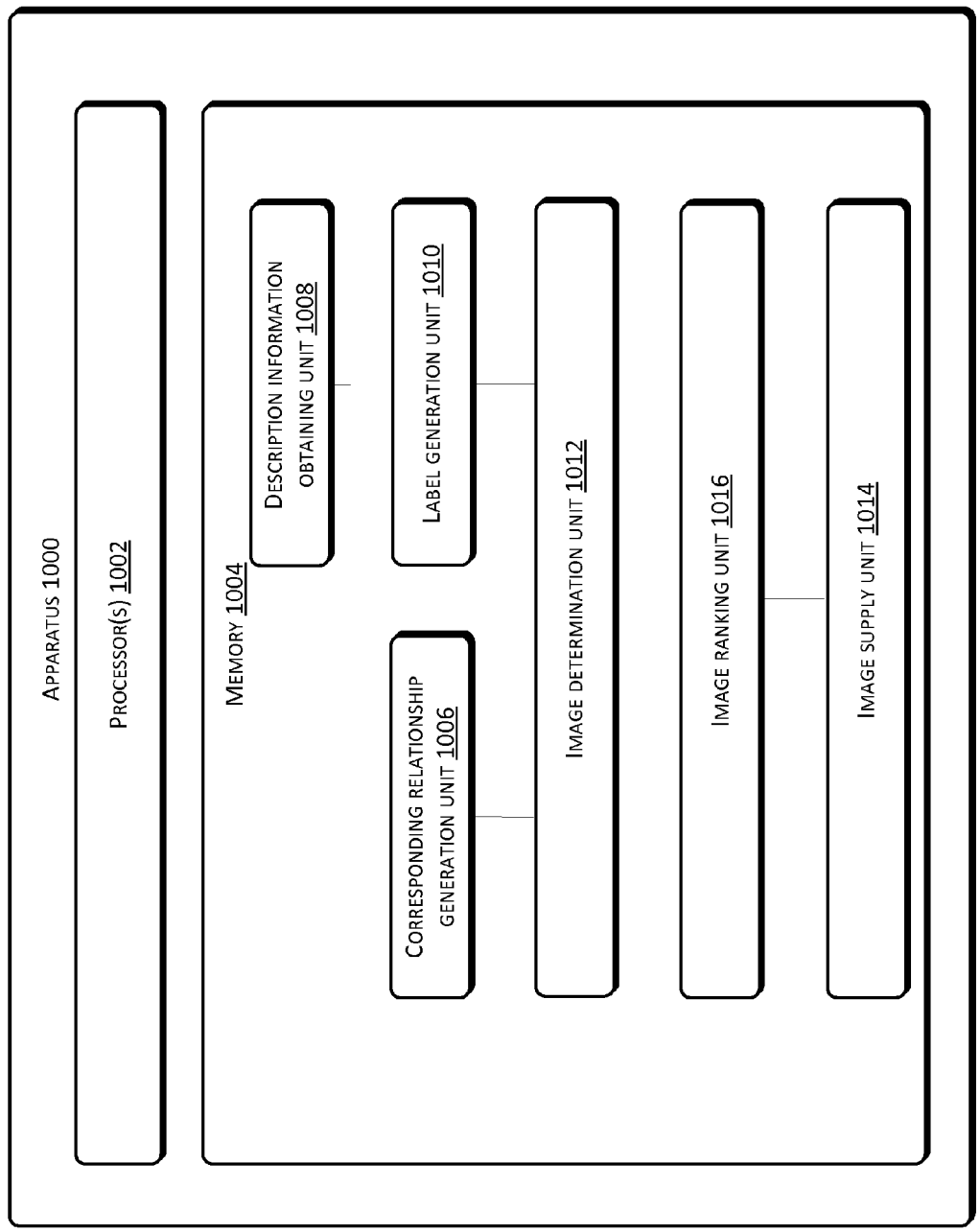
FIG. 11 illustrates a diagram of another example apparatus for searching images in accordance with a third example embodiment of the present disclosure.

As shown in FIG. 11, the apparatus 1000 may further include an image ranking unit 1016. The image ranking unit 1016, before the image supply unit 1014 sends the determined images to the client terminal that sends the image searching request, based on the received image searching request, extracts image features of the image for search included in the image searching request. The image ranking unit 1016 compares the image features of the image for search with image features corresponding to each of the determined images, and ranks the determined images according to their similarities degrees with the image for search from high to low.

The functionalities of each of the above units may correspond to relevant operations of image searching process in accordance with the first example embodiment of the present disclosure. Thus, details are not described herein.

The apparatus for searching images as described in the third example embodiment of the present disclosure may be implemented through one or more processors configured with computer-executable instructions. Persons skilled in the art should understand that the classification of the above units is only one of many unit classifications. If the units are classified otherwise or there is no classification of the units, as long as the apparatus for searching image has the above functionalities, such apparatus still falls within the protection scope of the present disclosure.

Further, the apparatus for searching images as described in the third example embodiment of the present disclosure may further include multiple units to implement respective functionality as described in the above first example embodiment of the present disclosure. Such classifications of units are not described herein.

At least one example provided by the present disclosure may re-use the existing text search engine, thereby improving the utilization rate of the server resources.

Persons skilled in the art should understand that the embodiments of the present disclosure can be methods, systems, or the programming products of computers. Therefore, the present disclosure can be implemented by hardware, software, or in combination of both. In addition, the present disclosure can be in a form of one or more computer programs containing the computer-executable or processor-executable instructions that can be implemented in the computer storage medium (including but not limited to disks, CD-ROM, optical disks, etc.).

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram can be implemented by computer program instructions. These computer program instructions can be provided to the general computers, specific computers, embedded processor or other programmable data processors to generate a machine, so that a device of implementing one or more flows of the flow chart and/or one or more blocks of the block diagram can be generated through the instructions operated by a computer or other programmable data processors.

These computer program instructions can also be stored in other computer storage media which can instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions can also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

The embodiments are merely for illustrating the present disclosure and are not intended to limit the scope of the present disclosure. It should be understood for persons in the technical field that certain modifications and improvements can be made and should be considered under the protection of the present disclosure without departing from the principles of the present disclosure.

What is claimed is:

1. A method performed by one or more processors configured with computer-executable instructions, the method comprising:
   receiving an image searching request, the image searching request including an image for search;
   obtaining description information of the image for search based on the image searching request;
   generating one or more normalized label vectors based on the description information corresponding to the image for search obtained by the description information, the one or more normalized label vectors corresponding to defined categories selected from a group consisting of a brief entity description label vector, an entity keyword label vector, an entity classification label vector, and an entity attribute label vector;
   multiplying each of the one or more normalized label vectors by a respective weight;
   generating a label of the image for search based on the one or more normalized label vectors; and
   determining one or more images in an image searching database that correspond to the label of the image for search based on a corresponding relationship between one or more respective labels and one or more respective images in the image searching database; wherein the one or more images in the image searching database are preprocessed comprising:
      generating one or more respective labels corresponding to one or more respective images in the image searching database; and
      storing the corresponding relationship between the one or more respective labels and the one or more respective images.

2. The method as recited in claim 1, further comprising: sending the determined one or more images to a client terminal that sent the image searching request.

3. The method as recited in claim 1, wherein the storing the corresponding relationship between the one or more respective labels and the one or more respective images comprises:
   using the one or more respective labels corresponding to the one or more respective images as an index; and
   using an inverted index to store the corresponding relationship between the one or more respective labels and the one or more respective images.

4. The method as recited in claim 1, wherein the storing the corresponding relationship between the one or more respective labels and the one or more respective images further comprises:
   extracting one or more image features of the one or more respective images in the image searching database; and
   storing a further corresponding relationship between the one or more respective labels, the one or more respective images corresponding to the one or more respective labels, and the one or more extracted image features of the respective images.

5. The method as recited in claim 1, further comprising: extracting image features of the image for search included in the image searching request;
   comparing the image features of the image for search with image features of the determined images; and
   ranking the determined images based on their similarity degrees with the image features of the image for search.

6. An apparatus comprising:
   a processor for generating a corresponding relationship with respect to each image in an image searching database, which generates a respective label of a respective image based on description information of the respective image and stores a corresponding relationship between the respective label and the respective image;
   a unit of a memory for obtaining description information that, based on an image searching request, obtains corresponding description information of an image for search included in the image searching request;
   a unit of memory for label generation that, based on the description information corresponding to the image for search obtained by the description information, generates a plurality of normalized label vectors corresponding to defined categories selected from a group consisting of a brief entity description label vector, a keyword label vector, an entity classification label vector, and an entity attribute label vector, multiplies each of the plurality of normalized label vectors by a respective weight, and generates a corresponding label of the image for search based on the plurality of normalized label vectors; and
   a unit of memory for image determination that, based on the corresponding relationship between the respective label and the respective image that is stored by the processor which generates a corresponding relationship, determines one or more images that correspond to the corresponding label of the image for search generated by label generation.

7. The apparatus as recited in claim 6, further comprising: an unit of memory for image supply that sends the one or more images determined by the image determination to a client terminal that sends the image searching request.

8. The apparatus as recited in claim 6, wherein the processor for generating corresponding relationship uses the generated label of each image as an index and uses an inverted index to store the corresponding relationship between labels and images.

9. The apparatus as recited in claim 6, wherein the processor for generating corresponding relationship extracts image features of each image in the image searching database and stores the corresponding relationship between the respective label, the respective image corresponding to the respective label, and respective image feature extracted from the respective image.

10. The apparatus as recited in claim 6, further comprising an image ranking unit that, before the image supply unit sends the determined images to the client terminal that sends the image searching request, based on the received image searching request, extracts image features of the image for search included in the image searching request, compares the image features of the image for search with image features corresponding to each of the determined images, and ranks the determined images according to their similarities degrees with the image for search from high to low.

11. An apparatus comprising:
   a processor for generating a corresponding relationship with respect to each image in an image searching database, which generates a respective label of a respective image based on description information of the respective image and stores a corresponding relationship between the respective label and the respective image;
a unit of a memory for obtaining description information that, based on an image searching request, obtains corresponding description information of an image for search included in the image searching request;
a unit of memory for label generation that, based on the description information corresponding to the image for search obtained by the description information, generates a plurality of normalized label vectors including a brief entity description label vector, a keyword label vector, an entity classification label vector, and an entity attribute label vector, multiplies the brief entity description label vector by a first category weight, multiplies the keyword label vector by a second category weight, multiplies the entity classification label vector by a third category weight, multiplies the entity attribute label vector by a fourth category weight, and generates a corresponding label of the image for search based on the plurality of normalized label vectors; and
a unit of memory for image determination that, based on the corresponding relationship between the respective label and the respective image that is stored by the processor which generates a corresponding relationship, determines one or more images that correspond to the corresponding label of the image for search generated by label generation.

12. The apparatus as recited in claim 11, further comprising:
an unit of memory for image supply that sends the one or more images determined by the image determination to a client terminal that sends the image searching request.

13. The apparatus as recited in claim 11, wherein the processor for generating corresponding relationship uses the generated label of each image as an index and uses an inverted index to store the corresponding relationship between labels and images.

14. The apparatus as recited in claim 11, wherein the processor for generating corresponding relationship extracts image features of each image in the image searching database and stores the corresponding relationship between the respective label, the respective image corresponding to the respective label, and respective image feature extracted from the respective image.

15. The apparatus as recited in claim 11, further comprising an image ranking unit that, before the image supply unit sends the determined images to the client terminal that sends the image searching request, based on the received image searching request, extracts image features of the image for search included in the image searching request, compares the image features of the image for search with image features corresponding to each of the determined images, and ranks the determined images according to their similarities degrees with the image for search from high to low.

* * * * *